Feb. 28, 1939. W. A. HOWARD ET AL 2,148,427

METHOD OF FABRICATING LINED VESSELS

Filed March 16, 1938

WAYNE A. HOWARD
TURNER C. SMITH
INVENTORS

ATTORNEY

Patented Feb. 28, 1939

2,148,427

UNITED STATES PATENT OFFICE 2,148,427

METHOD OF FABRICATING LINED VESSELS

Wayne A. Howard, Whittier, and Turner C. Smith, Huntington Park, Calif., assignors to Socony-Vacuum Oil Company, Incorporated, New York, N. Y., a corporation of New York Application March 16, 1938, Serial No. 196,132

2 Claims. (Cl. 29—162)

This invention relates to the art of lining steel and other metallic vessels with thin sheets of a corrosion or erosion resisting metal.

The object of the invention is to provide an improved method of attaching supporting members, such as lugs, brackets, etc., to the internal or lined wall of the vessel.

Heretofore it has been the practice to attach the bracket or other load supporting member to the lining, or else to place the bracket on top of the lining sheet and bolt through both the lining and the shell. Both of these methods have disadvantages which are recognized in the art but which have not heretofore been overcome.

Our improvement over present methods consists in fastening the bracket to the wall of the vessel by bolting or welding, forming in the liner sheet an opening of the shape of that face of the bracket which abuts the wall of the vessel but of slightly less area; upturning the edges of the liner sheet about said opening until the opening has been expanded to pass over the bracket, and finally welding the upturned edges of the liner sheet to the bracket.

Figure 1:
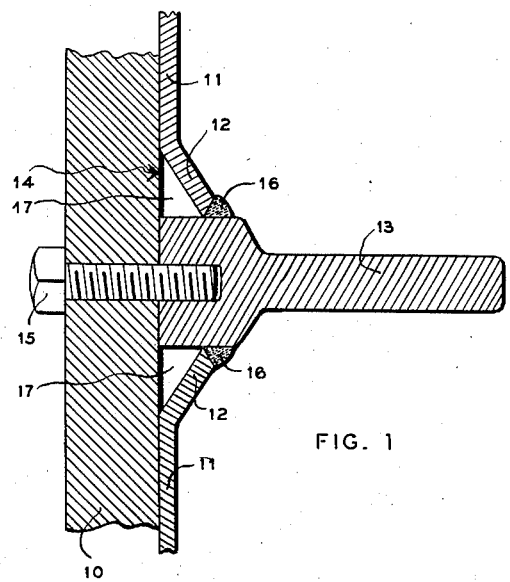
Figure 2:
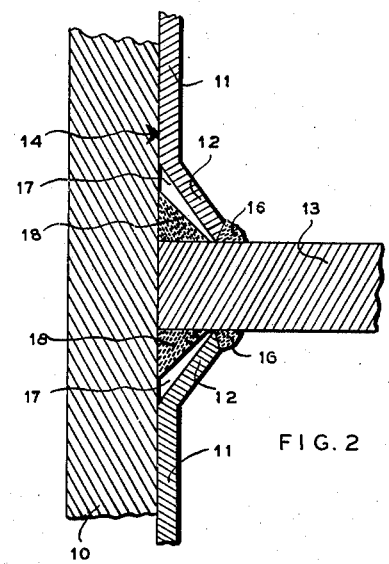
Figure 3:
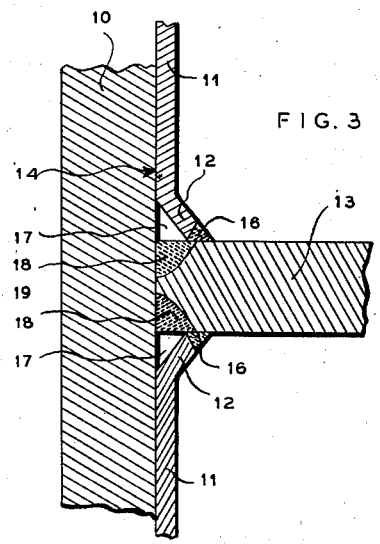

This procedure is illustrated in the attached drawing, all in section through the vessel wall, liner, and bracket, in which Fig. 1 illustrates a form of the invention in which the bracket is bolted to the wall of the vessel;

Fig. 2 illustrates a modification in which the bracket is attached to the vessel wall by a fillet weld, and Fig. 3 illustrates a modification in which the attachment is made by a fillet weld, the edges of the bracket being chamfered.

Referring first to Fig. 1, 10 and 11 are fragments, respectively, of the wall of the vessel and of the liner sheet. This sheet is upturned as at 12—12 around the bracket 13 which is drawn against the inner face 14 of the vessel wall by bolts such as indicated at 15 and which should be bottomed in the bracket metal as shown. The edges of the liner are then welded to the faces of the bracket as at 16—16, leaving an expansion channel 17—17.

In the form shown in Fig. 2 the construction is the same except that the bolts 15 are omitted and the bracket is attached to the inner wall of the vessel by the relatively heavy peripheral weld indicated at 18—18.

In the form shown in Fig. 3 the construction is the same as in Fig. 2 except that the face of the bracket abutting the vessel wall is chamfered as at 19—19 and the weld 18 placed in the chamfer.

This general method of attachment has the advantages that the load imposed on the bracket is carried solely by the relatively heavy wall of the vessel and not on the relatively frail liner and that the upturned edges of the liner provide a limited degree of flexibility along the line of juncture and tend to prevent the breaking of the weld between liner and bracket which often occurs, by reason of differential expansion and contraction, when the liner is attached to the bracket at a 90° angle.

We claim as our invention:

1. The method of permanently placing an internally projected supporting member within a metallic vessel having a liner of a metal different from that of said vessel, which comprises: attaching said supporting member directly to the wall of said metallic vessel; placing said liner around said supporting member and upturning the edges of said liner adjacent said member, and welding the terminal faces of said upturned edges to said member at a distance from the internal face of the wall of said vessel.

2. A method as in claim 1 in which said attachment is produced by bolting said member to said wall.

TURNER C. SMITH.
WAYNE A. HOWARD.